Figure 1:
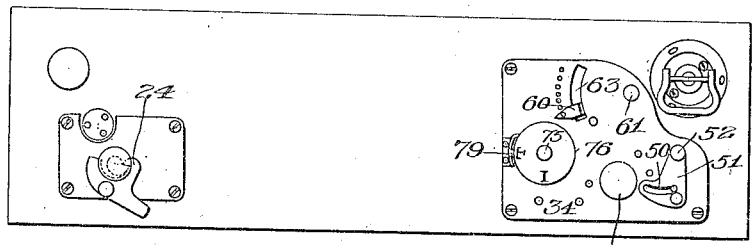

R. KROEDEL.
PHOTOGRAPHIC SHUTTER.
APPLICATION FILED AUG. 17, 1908.

937,248.

Patented Oct. 19, 1909.
4 SHEETS—SHEET 1.

Witnesses
Walter B. Payne
Russell B. Griffith

Inventor
Robert Kroedel
By Church & Rich
his Attorney

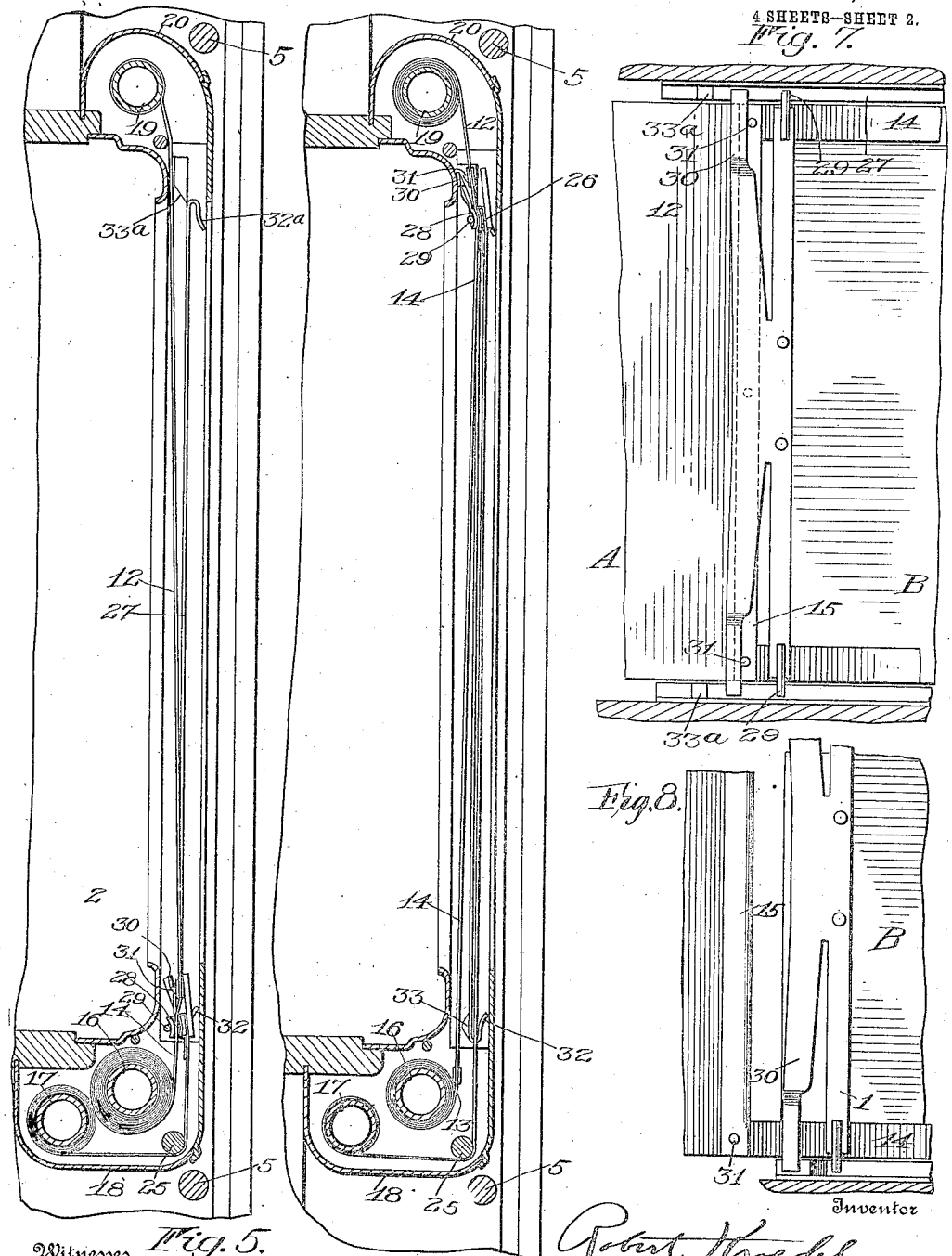

R. KROEDEL.
PHOTOGRAPHIC SHUTTER.
APPLICATION FILED AUG. 17, 1908.
937,248.
Patented Oct. 19, 1909.
4 SHEETS—SHEET 3.
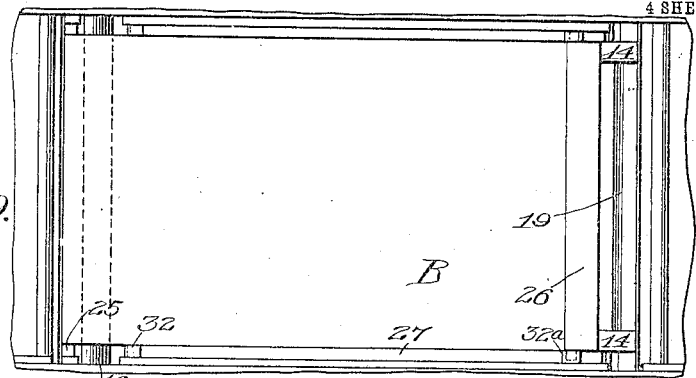
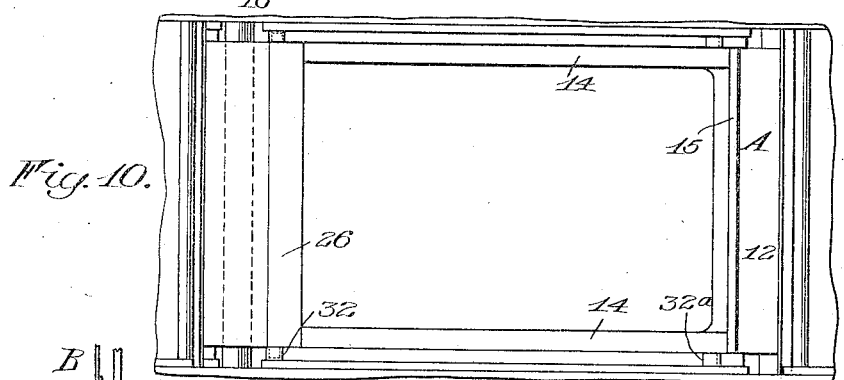
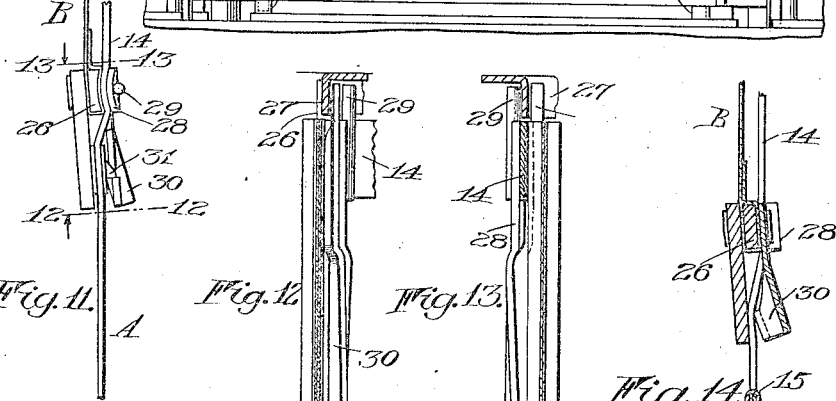
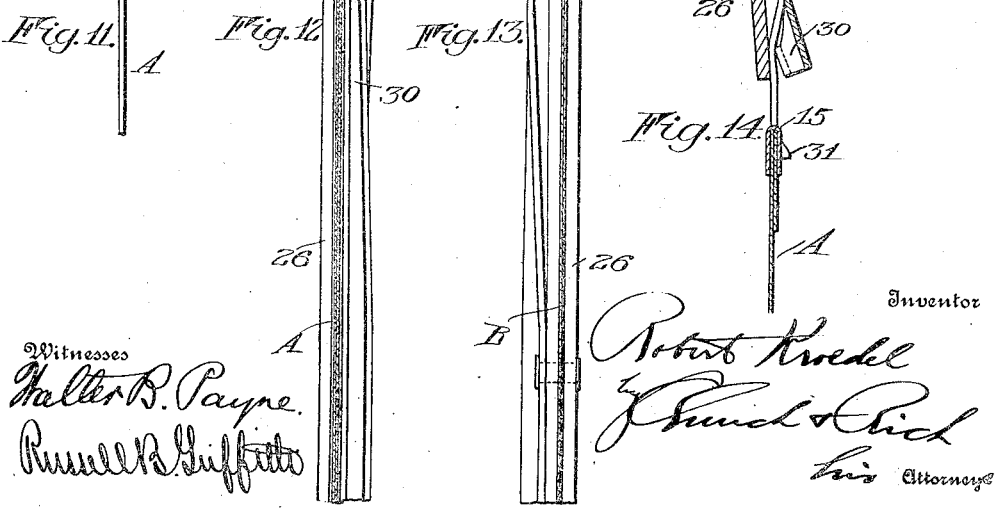

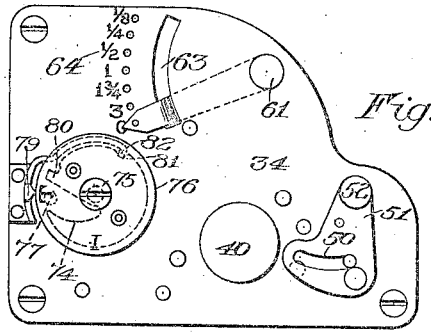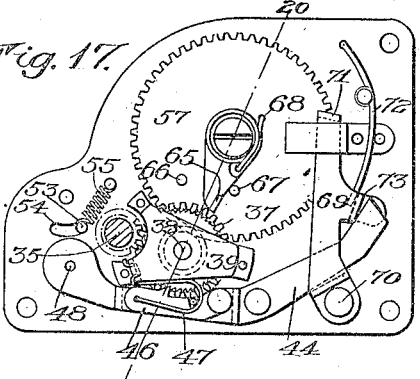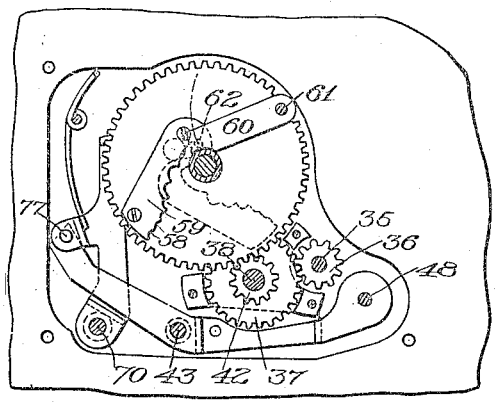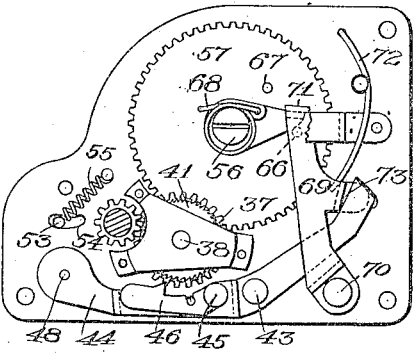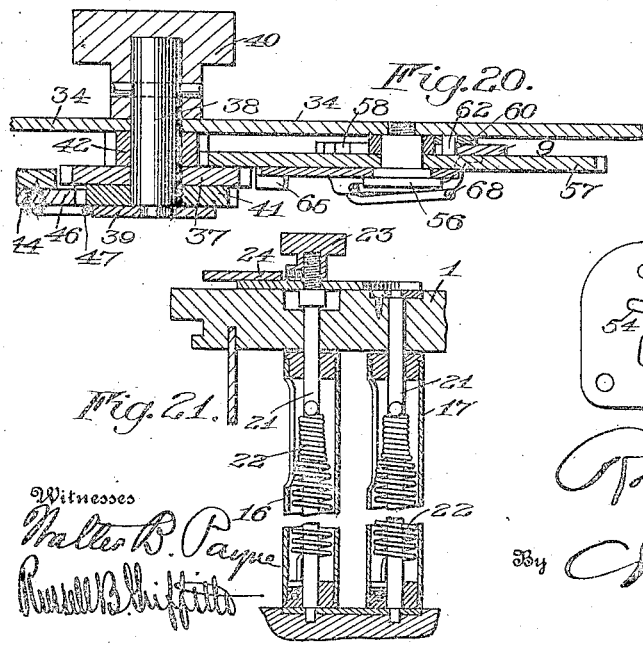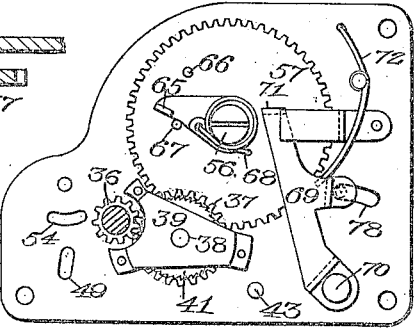

UNITED STATES PATENT OFFICE.

ROBERT KROEDEL, OF ROCHESTER, NEW YORK, ASSIGNOR TO EASTMAN KODAK CO., OF ROCHESTER, NEW YORK, A CORPORATION OF NEW YORK.

PHOTOGRAPHIC SHUTTER.

937,248.

Specification of Letters Patent.   Patented Oct. 19, 1909.

Application filed August 17, 1908.  Serial No. 448,806.

*To all whom it may concern:*

Be it known that I, ROBERT KROEDEL, of Rochester, in the county of Monroe and State of New York, have invented certain new and useful Improvements in Photographic Shutters; and I do hereby declare the following to be a full, clear, and exact description of the same, reference being had to the accompanying drawings, forming a part of the specification, and to the reference characters marked thereon.

My present invention relates to photography, and it has for its object to provide a shutter of the curtain type which will be of simple construction and convenient as to its methods of operation and which will provide for a closing of the shutter aperture during the resetting movement of the curtain as a protection of the film.

My improvements are further directed to the controlling devices for the shutter actuating mechanism whereby the exposures are prearranged and toward a simple and convenient arrangement thereof.

To these and other ends the invention consists in certain improvements and combinations of parts all as will be hereinafter more fully described, the novel features being pointed out in the claims at the end of the specification.

Figure 2:
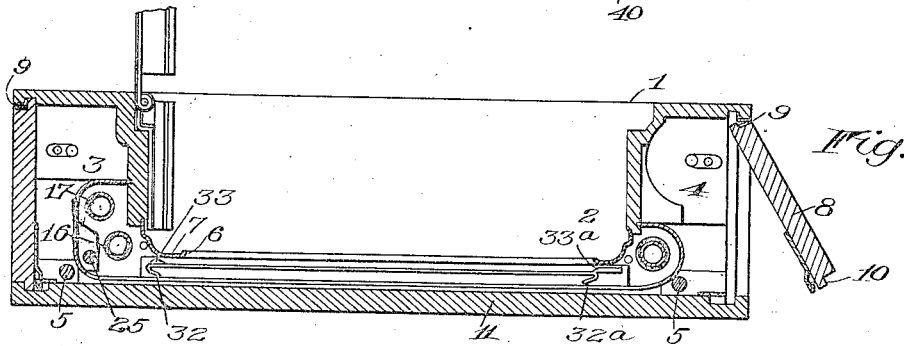
Figure 3:
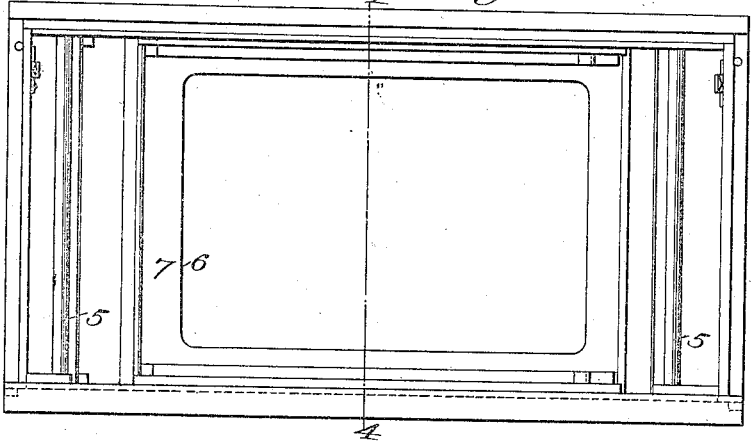
Figure 4:
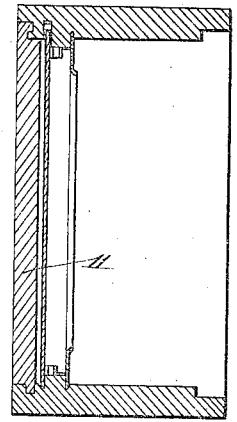

In the drawings: Figure 1 is an exterior view of the casing of a shutter constructed in accordance with and illustrating one embodiment of my invention, being a plan of the side of the casing upon which the shutter controlling devices are mounted. Fig. 2 is a longitudinal central section through the shutter and casing. Fig. 3 is a rear elevation of the casing, with the back removed, the curtains being omitted. Fig. 4 is a transverse section on the line 4—4 of Fig. 3. Fig. 5 is a view corresponding to that of Fig. 2, but on an enlarged scale, the casing being broken away and the curtains being in the position they occupy when an exposing movement of the shutter has been completed. Fig. 6 is a similar view with the curtains in the positions they occupy when the shutter aperture is about to be formed. Fig. 7 is an enlarged fragmentary elevation of the inner sides of the curtains and an adjacent portion of the guide therefor showing the manner in which their opposed edges are separated to form an exposure opening. Fig. 8 is a similar view after the separation has been effected. Fig. 9 is a rear elevation of the shutter before an exposure. Fig. 10 is a similar view showing the curtains in the positions they occupy during a time exposure. Fig. 11 is an enlarged detail side elevation of the curtains showing their interlocking devices. Fig. 12 is a transverse section of the same, taken substantially on the line 12—12 of Fig. 11. Fig. 13 is a similar transverse section, but taken substantially on the line 13—13 of Fig. 11. Fig. 14 is a longitudinal detail section, enlarged, of the interlocking edges of the two curtains. Fig. 15 is an exterior view of the journal plate which carries the controlling devices for the shutter actuating mechanism, the said devices being set for a time exposure. Fig. 16 is a section taken coincident with the under face of said plate. Fig. 17 is a view of the underside of the plate, with the mechanism attached and the parts thereof in the positions they occupy when the shutter is set for a time exposure. Fig. 18 is a similar view with the parts in the position they occupy during a time exposure. Fig. 19 is a similar view with the parts in the position they occupy after an exposure has been effected, the shutter being set for instantaneous work. Fig. 20 is a transverse section through the controlling mechanism, taken substantially on the line 20—20 of Fig. 17, and Fig. 21 is a detail transverse section through a portion of the shutter casing showing the tension members of the actuating mechanism in longitudinal section.

Similar reference characters in the several figures indicate similar parts.

In the present instance I have shown a shutter casing 1 (Figs. 1, 2, 3, and 4) which also forms the camera casing being constructed with the usual central bellows chamber 2 and film spool chambers 3 and 4 upon either side thereof, the film being fed in the usual manner over guide rolls 5 past an exposure opening 6 in the camera shutter casing formed in a plate 7. The ends of the casing 8 are preferably hinged at their forward edges, as at 9, while the opposite or rear edges are provided with rabbets 10, as are also the corresponding edges of the remaining walls of the casing to coöperate with the back 11 or similarly fitted film or plate holder, the construction just described, being such as to give convenient and immediate access to the interior parts.

The shutter proper comprises two curtains A and B which operate across the exposure opening in the plate 7 in a plane adjacent to the front face thereof. The curtain A preferably comprises opaque end portions 12 and 13 (Fig. 5) connected by side tapes 14 running at the sides of the exposure opening 5 and upon these side tapes is adjustably secured the curtain B so that the end thereof is adjustable relatively to the edge 15 of curtain A to form the exposure opening of the shutter, which opening may be regulated as to size, by a relative movement of the curtain.

The shutter actuating mechanism comprises in the present instance two tension rollers 16 and 17, preferably arranged within a housing 18 in the film chamber 3, and a winding roller 19 protected by a housing 20 in the opposite film chamber 4. The tension rollers may be of any usual or preferred type and are herein shown (Fig. 21) mounted loosely upon shafts 21 journaled in the casing 1, and encircled by springs 22, the ends of which are attached to the shafts and rollers, respectively. The roller 17 need not be of adjustable tension but the shaft of roller 16 is preferably fitted with a knob at 23 upon an exteriorly projecting end so that the tension of the spring as exerted upon the roller can be increased or decreased under the control of an escapement 24, as is well known in the art. Curtain A is wound at one end upon the adjustable tension roller 16 and at the other upon the winding roller 19, while curtain B is wound upon tension roller 17 solely, its outer end passing over the guide roller 25, and thence in a plane adjacent to that occupied by curtain A which is stretched between the rollers.

The end or edge of curtain B which serves to define the exposure opening of the shutter, as previously described, is provided with a stiffening strip 26, the ends of which engage upon one side of guiding ribs 27 upon opposite sides of the casing. Secured to the stiffening strip are spring fingers or clamping members 28 (Figs. 7 and 8) beneath which pass the side tapes 14 of curtain A to be clamped by them in such manner as to hold curtain B in a definite position upon curtain A, projecting and preferably rounded ends 29 of the members 28 engaging loosely upon the opposite sides of the guide ribs 27 from the stiffening strip 26 whereby the two curtains are held in substantially the same plane throughout their joint movement. Also arranged on the stiffening strip 26 are spring fingers 30 which extend across the side tapes 14 and are inclined toward the edge 15 of curtain A, as shown in Fig. 11, to form spring abutments behind which are adapted to automatically engage coöperating pins or abutments 31 at the extremities of the tapes 14 when the adjacent edges of the curtains are moved toward each other to a sufficient degree to completely close the exposure opening of the shutter. The tension of roller 17 is not sufficient to overcome the frictional or gripping engagement of the clamping devices on curtain B with the side tapes on curtain A and the controlling devices for the winding roller 19, which will be hereinafter described, are such as will be suitable to enable the operator to move both curtains against the combined power of their respective tension rollers. It is essential that the tension of roller 16 be only great enough to readily effect the winding of curtain B and keep the latter under a slight tension while the speed of the shutter aperture, as defined by the two curtains, in crossing the field of exposure, can be regulated within the desired limits by the adjustable tension of the roller 16.

The guiding ribs 27 on the casing are provided at each end of the exposure opening 5 of the latter with arresting stops 32 and 32ª on the sides of the ribs upon which the stiffening member 26 of curtain B operates and upon the opposite sides with adjacently arranged wedge-shape cams 33 and 33ª, the stops operating to arrest the winding or unwinding movement of curtain B by coöperation with the said stiffening strip when this curtain has passed across the field of exposure in either direction, while the purpose of the cams 33 is to displace the clamping members 28 from the tapes 14 to prevent relative movement of the two curtains in the one case, and to release the spring abutments 30 from coöperation with the pin abutments 31 for the same purpose in the other.

The operation of the shutter as thus far described will now be explained. Assuming that the parts are now in the position shown in Fig. 5, which is that occupied when an exposure has been made, and before resetting, the opaque portion 12 is at the time extended across the field of exposure; the tapes 14 and the opposite opaque end portion 13 are wound upon the tension roller 16; curtain B is wound upon tension roller 17, its stiffened edge being thereby held against the abutment 32 with the clamping members 28 engaging the ends of the tapes 14 and the pin projections 31 are in coöperation with the spring abutments 30 on curtain B as clearly shown in Fig. 7, the proximate edges of the two curtains being slightly lapped and the exposure opening of the shutter being thereby closed. Upon imparting a winding movement to roller 19 the two curtains are moved back across the field of exposure until the edge of curtain B engages the abutments 32ª by which it is arrested (Fig. 6) in such a position as to completely cover the field of exposure and protect the sensitized material. At this point the cams 33ª simultaneously act upon the spring abutments 30 disengaging the pin abutments 31 on curtain A therefrom while the clamping members 28 are still in operative position. Upon a further winding movement of roller 19 the frictional engagement of the clamping members 28 of curtain B on the tapes 14 will be overcome and the edge 15 of curtain A will move away from the edge of curtain B as far as is desired to produce a shutter aperture of any required size for the succeeding exposure. The amount of this further winding of curtain A is regulated by the operator by means of devices to be hereinafter described. To effect an exposure the winding roller 19 is now released whereupon the two curtains move in the opposite direction across the field of exposure through the action of the tension rollers 16 and 17, and curtain B being in advance is arrested by the stop 32 after having crossed the exposure opening 6 in the camera and before curtain A has completed its travel. But the cams 33 adjacent the stop 32 act instantly to release the clamping members 28 permitting a continued and independent movement of curtain A until the abutments 31 on the latter have engaged the spring abutments 30 and the two curtains are again overlapped and ready to be reset as before. For a time exposure the separation of the curtain is made so great that curtain B will have completed its travel before curtain A starts to cross the aperture 6, as shown in Fig. 10, means being provided for arresting the shutter in this position with the shutter aperture opposite the exposure opening and subsequently releasing curtain A, all as will be described.

Referring more particularly to Figs. 1 and 15 to 20, I will now proceed to describe devices for regulating the shutter actuating mechanism including means for regulating the width of the shutter aperture. These devices may be carried upon a wall of the shutter casing 1, but I prefer to mount them upon a plate 34 secured to the latter and in which the shaft 35 of the winding roller 19 is journaled. Adjacent to its journal the shaft 35 carries a pinion 36 which meshes with a gear 37 carried on a shaft 38 supported between the plate 34 and a housing 39 and terminating on the outside of the plate and exteriorly of the casing in a winding knob 40. The shaft 38 also carries, fixed with the gear 37, a ratchet 41 and a gear 42. Pivoted at 43 on the under side of the plate 34 is a master lever 44 to which is in turn pivoted at 45 a pawl 46 that normally engages the ratchet 41 through the tension of a spring 47 but is moved out of coöperative relation therewith upon the oscillation of the lever. A pin 48 on the master lever projects through a slot 49 in the journal plate 34 and within a cam slot 50 (Fig. 15) in a releasing lever 51 that is reciprocated on the center 52 to vibrate the master lever 44, as will be understood while a pin 53 on the releasing lever projecting through a slot 54 in the plate 34 forms a means of attachment for one end of a spring 55 that tends to hold the releasing lever in a position to retain the pawl 47 on the master lever in engagement with the ratchet 41, the parts being so arranged that the ratchet prevents the unwinding of the roller 19 under the influence of the tension roller. Mounted on a stud 56 on the under side of the plate 34 is a toothed disk 57 which meshes with the gear 42 on the shaft 38 and is, therefore, movable with the winding roller. This disk is provided upon one side with a plurality of abutments 58 spaced both radially and circumferentially of the disk relatively to each other and formed, in the present instance, by the serrated edge of a plate 59. A lever 60 pivoted at 61 to the plate 34 carries a stop pin 62 adapted to coöperate with the abutments 58 and the pivot of the lever 60 is so arranged that the stop is permitted a movement radially of the disk and is adapted to selectively engage the abutments thereon to halt its rotation after a greater or less amount of travel, the abutment nearer the center of the disk allowing greater travel of the latter than that nearer the periphery, as shown in Fig. 16. The end of the lever 60 is preferably offset so as to project through a slot 63 in the plate 34 and coöperate in the capacity of an indicator with index characters 64 marked on the plate adjacent to said slot. Having in mind the manner in which the curtain aperture is regulated in size it will be seen that guided by the index 64 the operator can set the stop 62 in different positions for engagement with an abutment 58 in either an advanced or rearward position relatively to the travel of the disk 57, and the latter being always movable with the winding roller 19, curtain A is separated from curtain B to more or less extent. The disk 57, it will be remarked, in the embodiment of the invention herein shown, is so proportioned as to make less than a complete revolution during the most extreme winding movement of the curtain and the stop 62 will, therefore, engage the abutting plate 59 only from one, and that the serrated side. For an instantaneous or automatically timed exposure the curtain is released by a single movement of the releasing lever 51 which causes the master lever 44 to operate the pawl 46 out of engagement with the retaining ratchet 41 and the exposure is completed in one operation of the shutter actuating mechanism, but for a time exposure the unwinding of the curtains must take place intermittently and to effect this I provide the following means: Pivoted on the disk 57, preferably upon the same center as shown, is a pawl or stop 65 movable with the disk and connected parts, but also having an independent movement relatively thereto limited by abutments 66 and 67 on the face of the disk, the said stop being normally held against abutment 66 which is in advance of the other in the direction of the unwinding movement of the disk by a spring 68. A detent lever 69 is pivoted to the plate 34 at 70 and has a projecting portion 71 on the end thereof which is movable into the path of the stop 65 and also into two positions out of the path of the said stop, one toward the center of the disk 57, as shown in Fig. 19, and the other toward the circumference thereof, as shown in Fig. 17, in which latter position it is normally held as by the spring 72. In this position also it is under the influence of the master lever 44 by reason of a contact therewith at 73 and is capable of being moved thereby to the position shown in Fig. 18 in the path of the stop 65 by the same movement of the master lever that disengages pawl 46 from the ratchet 41 and similarly when the pawl is in engagement the detent 69 is out of the path of the stop. The detent is moved to the inward position of Fig. 19 for the purpose of the instantaneous exposure, heretofore described, by means that will be later referred to, in which position it is beyond the influence of the master lever.

In Fig. 17 the parts are shown in the position they occupy when the shutter is set for a time exposure, the curtains being taken up on the winding roller as shown in Fig. 9. When the master lever 44 is oscillated by means of the releasing lever 51 the retaining pawl 46 is released from the ratchet 41 permitting the unwinding of the roller, but at the same time throwing the detent 69 into the path of the stop 65. When the stop engages the detent it is rotated from the abutment 67 on the disk to the rearward abutment 66, as shown in Fig. 18, and the disk and the shutter actuating mechanism connected therewith is halted at a time when the curtain B has completed its travel across the exposure opening 6 of the camera, but before the opaque portion 12 of curtain A has started across, or in other words, when the shutter opening is coincident with the field of exposure, as previously described and shown in Fig. 10. The operator then allows releasing lever 51 to fly back under the tension of spring 55, whereupon the retaining pawl 46 is moved by the master lever 44 back into engagement with the ratchet 41 and the mechanism is locked against movement, though the detent 69 is simultaneously moved out of engagement with the stop 65. The stop being thus released flies over to the opposite abutment 67 and upon a subsequent oscillation of the master lever by the operator to complete the exposure the detent 69, though moved as before is in rear of the stop and the retaining pawl 46 being simultaneously released, the disk and the shutter actuating mechanism are permitted to complete their movement, whereby curtain A is actuated across the field of exposure into engagement with curtain B ready for a subsequent resetting. After the exposure the stop 65 is in the position shown in Fig. 17 and during the rewinding movement has no difficulty in passing the detent 69 as the latter is normally held out of its path.

The means which I prefer to employ for throwing the detent 69 into position for an instantaneous or automatically timed exposure comprises in the present instance a cam 74 journaled on a stud 75 and covered by a knurled head 76 on the exterior of the plate 34, the cam being shown in dotted lines in Fig. 15. It is adapted to engage a pin 77 on the detent 69 which pin projects through and is movable in a slot 78 in the plate. Upon rotation of the head 76 in one direction the cam engages the pin to throw the detent into the position shown in Fig. 19, that is, permanently out of the path of the stop 65 for the instantaneous work, as before described, while rotation in the opposite direction disengages the cam from the pin and allows the detent to assume the position shown in Fig. 17 under tension of spring 72 where it is subject to the control of master lever 44 in the manner previously described. Two adjustments are conveniently determined by a pointer 79 on the plate 34 which registers with either of two letters, such as "I" and "T" to designate the positions for time or instantaneous work, the movement of the cam being limited by abutments 80 and 81 thereon which are alternately engaged by a stop 82 formed in the present instance by an extension on the pointer 79.

The shutter controlling devices, it is evident, are not necessarily limited in their application to a shutter of the particular type herein shown in combination therewith. For instance, both the means for regulating the winding movement and the means for effecting the intermittent time exposure could be well applied to a multiple aperture, continuous wound curtain with a slight change in the proportions of the gearing.

I claim as my invention:

1. In a photographic shutter, the combination with two curtains having relatively adjustable edges defining the exposure opening and means for operating the curtains simultaneously across the field of exposure in either of two directions, of means for arresting the movement of the advance curtain during the exposing movement of the shutter until the other has moved relatively thereto to close the exposure opening and automatically interlocking projecting elements one on each of the two curtains for retaining them in closed relation during a resetting movement of the shutter, the engagement of the abutments being such as to permit the advance curtain to be rewound through the medium of the other.

2. In a photographic shutter, the combination with two curtains having relatively adjustable edges defining the exposure opening and means for operating the curtains simultaneously across the field of exposure in either of two directions, of means for arresting the advance curtain during the exposure movement of the shutter until the other has moved relatively thereto to close the exposure opening, automatically interlocking projecting abutments one on each of the two curtains for retaining them in closed relation during a resetting movement of the shutter, means for arresting the advance curtain during such movement and means for automatically releasing the abutments to permit the other curtain to continue relatively to the first to reëstablish the opening in the shutter.

3. In a photographic shutter, the combination with a casing provided with guides, of two curtains having relatively adjustable edges defining the exposure opening, means for operating the curtains simultaneously across the field of exposure, clamping members upon one of the curtains engaging upon opposite sides of the other end of the guides on the casing, means for arresting one of the curtains and means for simultaneously releasing the clamping members to permit the other curtain to continue relatively thereto to change the shutter opening.

4. In a photographic shutter, the combination with a casing provided with a guide having a stop on one side thereof and a cam on the other, of two curtains having relatively adjustable edges defining the exposure opening, means for operating the curtains simultaneously across the field of exposure and two coöperating clamping members on one of them engaging upon opposite sides of the other and of the guide, one of said members being adapted to engage the stop and the other to be released from the first by engagement with the cam to prevent a relative movement of the curtains.

5. In a photographic shutter, the combination with a curtain and a winding roller therefor, of means for limiting the winding movement of the curtain, comprising a disk rotatable with the roller and provided with a series of abutments spaced relatively to each other, both radially and circumferentially of the disk and an adjustable stop adapted to selectively engage the abutments.

6. In a photographic shutter, the combination with a curtain, and a winding roller therefor, of means for limiting the winding movement of the curtain, comprising a disk rotatable with the roller and provided with a series of abutments spaced relatively to each other both radially and circumferentially of the disk and a lever having a relatively fixed pivot and provided with a stop movable radially of the disk into position for selective engagement with the abutments.

7. In a photographic shutter, the combination with a curtain, a winding roller therefor and a journal plate for the roller having an index thereon and a slot adjacent the index, of means for limiting the movement of the curtain comprising a disk rotatable with the roller and provided with a series of abutments spaced relatively to each other both radially and circumferentially of the disk and a lever pivoted to the journal plate and provided with a stop movable radially of the disk into position for selective engagement with the abutments, said lever having an offset portion extending through the slot in the journal plate and forming an indicator coöperating with the index on the latter.

8. In a photographic shutter, the combination with a curtain and actuating mechanism therefor, of controlling devices for effecting an intermittent movement of the curtain comprising a stop movable with and having a limited movement independently of the actuating mechanism, yielding means for normally holding the stop at one limit of its independent movement, a detent movable into and out of the path of the stop and adapted to engage the latter and bring the actuating mechanism to a halt when the stop has reached the other limit of its movement, means for locking the curtain actuating mechanism and means for throwing said locking means and the detent alternately into and out of operative position.

9. In a photographic shutter, the combination with a curtain and actuating mechanism therefor, of controlling devices for effecting an intermittent movement of the curtain comprising a member movable with the roller, a stop carried by said member and having a limited movement relatively thereto, yielding means for normally holding the stop at one limit of its movement, a detent movable into and out of the path of the stop and adapted to engage the latter and bring the actuating mechanism to a halt when the stop has reached the other limit of its movement, means for locking the curtain actuating mechanism and means for throwing said locking means and the detent alternately into and out of operative position.

10. In a photographic shutter, the combination with a curtain and actuating mechanism therefor, of controlling devices for effecting an intermittent movement of the curtain comprising a disk driven by the actuating mechanism and provided with two abutments, a stop pivoted on the disk and movable relatively thereto between the abutments, yielding means for normally holding the stop against one abutment, a detent movable into and out of the path of the stop and adapted to engage the latter and arrest the disk and actuating mechanism through a coöperation of the stop with the other abutment, means for locking the actuating mechanism and means for throwing said locking means and the detent alternately into and out of operative position.

11. In a photographic shutter, the combination with a curtain and actuating mechanism therefor, of controlling devices for effecting an intermittent movement of the curtain comprising a stop movable with and having a limited movement independently of the actuating mechanism, yielding means for normally holding the stop at one limit of its independent movement, a detent lever movable into and out of the path of the stop and adapted to engage the latter and bring the actuating mechanism to a halt when the stop has reached the other limit of its movement, means for locking the actuating mechanism and a master lever controlling the detent lever and locking means to throw them alternately into and out of operative position.

12. In a photographic shutter, the combination with a curtain and actuating mechanism therefor, of controlling devices for effecting an intermittent movement of the curtain comprising a stop movable with and having a limited movement independently of the actuating mechanism, yielding means for normally holding the stop at one limit of its independent movement, a detent lever movable into and out of the path of the stop and adapted to engage the latter and bring the actuating mechanism to a halt when the stop has reached the other limit of its movement, a master lever controlling the detent lever, a ratchet driven by the actuating mechanism, and a pawl carried by the master lever and engaging the ratchet to lock the actuating mechanism when the detent lever is moved from its operative position, said pawl being disengaged when the detent lever is moved into the path of the stop.

13. In a photographic shutter, the combination with a curtain and actuating mechanism therefor, of controlling devices for effecting an intermittent movement of the curtain comprising a disk driven by the actuating mechanism and provided with two abutments, a stop pivoted on the disk and movable relatively thereto between the abutments, yielding means for normally holding the stop against one abutment, a detent lever movable into and out of the path of the stop and adapted to engage the latter and arrest the disk and actuating mechanism through a coöperation of the stop with the other abutment, a master lever controlling the detent lever, a ratchet driven with the actuating mechanism, and a pawl carried by the master lever, and engaging the ratchet when the detent lever is moved to inoperative position.

14. In a photographic shutter, the combination with a curtain and actuating mechanism therefor, of controlling devices for the actuating mechanism comprising means for locking the latter against movement in one direction, a stop movable with the actuating mechanism, a detent movable into and out of the path of the stop and a master member controlling the detent and the locking means and serving to throw them alternately into and out of operative position, the said detent being movable independently of the master member to a permanent position out of the path of the stop and beyond the control of the master member.

15. In a photographic shutter, the combination with a curtain, actuating mechanism therefor embodying a roller and a journal plate for the latter, of controlling devices for the actuating mechanism comprising means for locking the roller against movement in one direction, a stop movable with the roller, a detent lever on the journal plate movable into and out of the path of the stop to arrest and release the roller, a master lever also mounted on the journal plate to control the locking means and detent lever and serving to normally throw them alternately into and out of operative position and means coöperating with the detent lever to move the latter out of the path of the stop and beyond the control of the master lever.

ROBERT KRUGER.

Witnesses:
RUSSELL B. GRIFFITH,
HAROLD H. SIMMS.